Oct. 22, 1968 A. W. HOWE 3,406,861

TABLE CONTAINER FOR LUMPY OR GRANULATED GOODS

Filed Sept. 12, 1967 5 Sheets-Sheet 1

INVENTOR
August Wilhelm Höwe
BY
[signature]
AGENT

Inventor
August Wilhelm Höwe
BY
H. Gibner Lehmann
AGENT

Fig.5
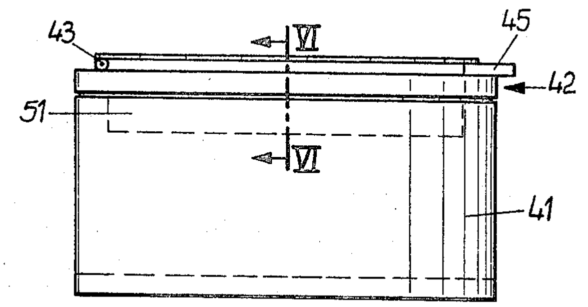
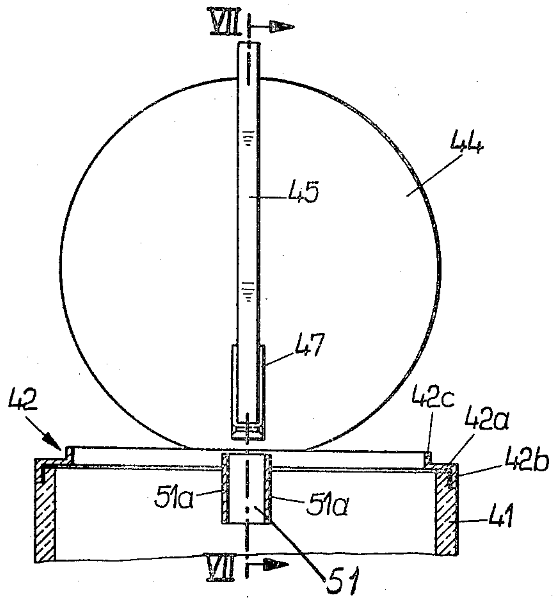
Fig.6
Inventor
August Wilhelm Höwe
BY
H. Gilmer Lehmann
AGENT Inventor
August Wilhelm Höwe
BY
H. Gibner Lehmann
AGENT Oct. 22, 1968 A. W. HOWE 3,406,861
TABLE CONTAINER FOR LUMPY OR GRANULATED GOODS
Filed Sept. 12, 1967 5 Sheets-Sheet 5
Fig. 9
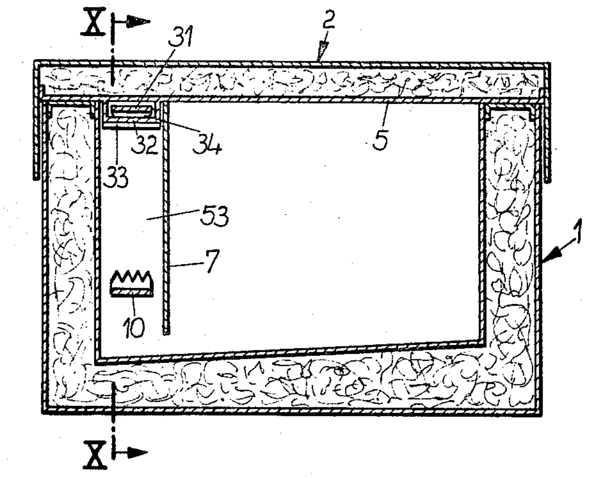
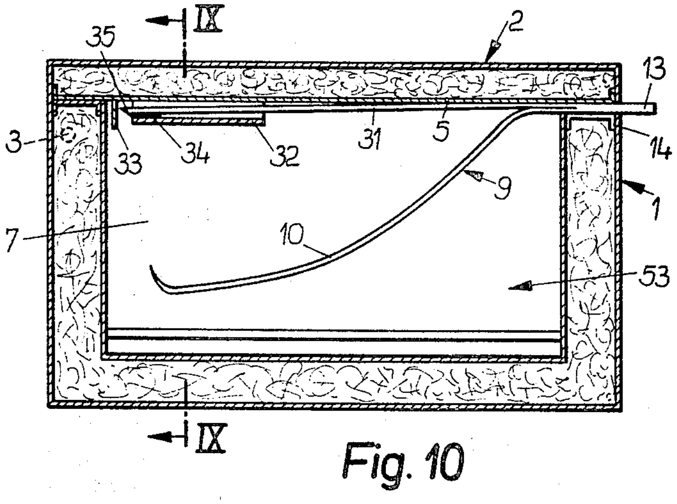
Fig. 10
Inventor
August Wilhelm Höwe
BY
H. Gilbert Lehmann
AGENT United States Patent Office 3,406,861
Patented Oct. 22, 1968

3,406,861

TABLE CONTAINER FOR LUMPY OR GRANULATED GOODS

August Wilhelm Howe, Gottelmannstr. 42, Mainz (Rhine), Germany

Continuation-in-part of application Ser. No. 541,006, Apr. 7, 1966. This application Sept. 12, 1967, Ser. No. 668,745
12 Claims. (Cl. 220—36)

ABSTRACT OF THE DISCLOSURE

A table container for granulated or lump-like products, comprising an open-top container structure including a hinged top cover which can be swung upward. The container includes a holder for a utensil such as tongs intended to be stored in the container, and a partition arrangement providing a compartment for the utensil, to keep the latter from contact with the product. The handle of the utensil projects from the container, and when lifted it raises the hinged cover, making the utensil and interior of the container available for use.

*Cross references to related applications*

Copending application of August Wilhelm Howe, Ser. No. 541,006 filed Apr. 7, 1966, and entitled, "Dispensing Device For Ice Cubes, Lump Sugar and the Like," of which this application is a continuation-in-part.

*Background*

This invention relates to table containers for lumpy or granulated goods, as for instance, containers for ice cubes, cube sugar and the like, and more particularly to a container having a tilting lid mounted on a horizontal axis, and having a place for a utensil such as an ice or a sugar tongs, a sugar spoon, etc. Such utensils may be arranged so that the handle extends out from under the lid or cover of the container.

It is usual in the case of marmalade containers which have a lid that pushes to the side or tilts, to provide in the lid or else at the upper edge of the container a notch or opening so that a spoon stuck in the marmalade can at one end extend out from under the lid. These well-known marmalade containers provide a certain amount of support for the spoon when the lid is closed. However, the spoon remains in the contents of the container at all times that it is stored. Also, it does not move with the opening and closing of the lid.

There are also prior containers such as sugar boxes which have the sugar tongs attached to the lid of the box with the handle projecting out from the lid. In the case of these well-known sugar boxes, however, the handling of the sugar tongs is impractical and unpredictable because of the lid of the box, being firmly connected with the sugar tongs not only interferes with the handling of the tongs and with the ability to insert them into the box, but also, during the handling of the tongs, prevents one from seeing the tong ends or claws.

*Summary*

The disadvantages of these prior devices are obviated by the present invention, and it is one object of the invention to create an improved table container for lump-like or granulated goods, in which the utensil for removing the contents is kept especially sanitary, by being separate from the contents inside the closed container, and in which the utensil with its handle extending out from under the lid will also serve as a convenient and useful means for opening and closing the lid of the container.

Moreover, the objects of the invention include the provision of an improved container as above, wherein the utensil is light in weight and easy to remove and use, as well as being carried by and readily detachable from the lid of the container while the lid remains attached or captive at all times.

This is achieved according to the invention, by the provision of a specified place and means on the container which acts at one and the same time to temporarily connect or couple the utensil to the lid for opening and closing the same, and to guide the utensil while keeping it separate from the container contents.

By such organization it is possible not only to store the utensil in a hygenic way which prevents it from getting or staying soiled, but also to require the user to grasp the utensil only by the handle. The handle of the utensil thus serves at one and the same time as the utensil handle and also as a handle for the lid, so that the latter can be conveniently opened and closed even though the utensil may be completely separate from the lid or the container. This assures the utmost convenience in handling, and in using the container.

The invention can be carried out in two basically different ways, as follows:

(a) The holding and guiding arrangement for the utensil can be set up inside the container in the form of a separate compartment means, whereby the temporary connection between the utensil and the lid of the container can consist of a simple abutting engagement.

(b) The holding and guiding arrangement for the utensil can be actually attached to the bottom of the lid, and in this way the utensil would be kept above and separate from the contents of the container. The temporary connection between the utensil and the lid of the container is in this case comparatively rigid, thereby producing a very secure lever for the opening and closing of the lid. The utensil can, however, be removed from or attached to the lid when the latter is open. If, in this case, a portion of the utensil projects relatively far down from the underside of the lid, then the invention provides inside of the container a separate compartment into which the said utensil portion can be disposed.

The following will describe several examples of the invention as illustrated in the drawings, in which:

FIG. 5 is a side elevational view of the table container of FIGS. 3 and 4.

FIG. 6 is a view partly in vertical section and partly in elevation, of the sugar box according to FIG. 5 but with the lid raised. The lower portion of the box is omitted and the lid is open. The section is on line V—V of FIG. 4.

Figure 7:
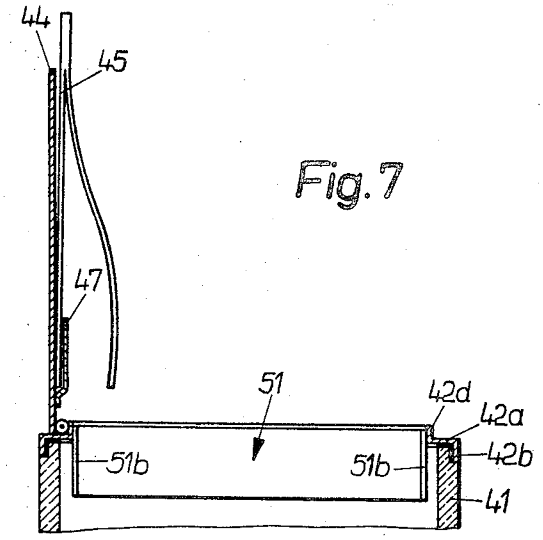

FIG. 7 is a vertical cross-section taken on line VII—VII in FIG. 6.

Figure 8:
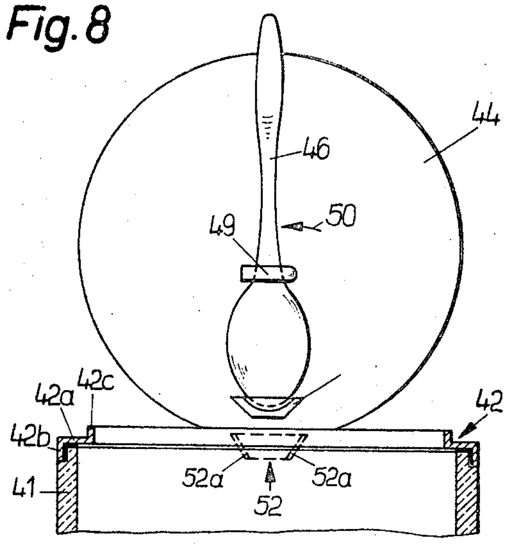

FIG. 8 is a view partly in vertical section and partly in elevation similar to FIG. 6, illustrating a variation of the invention.

Figure 1:
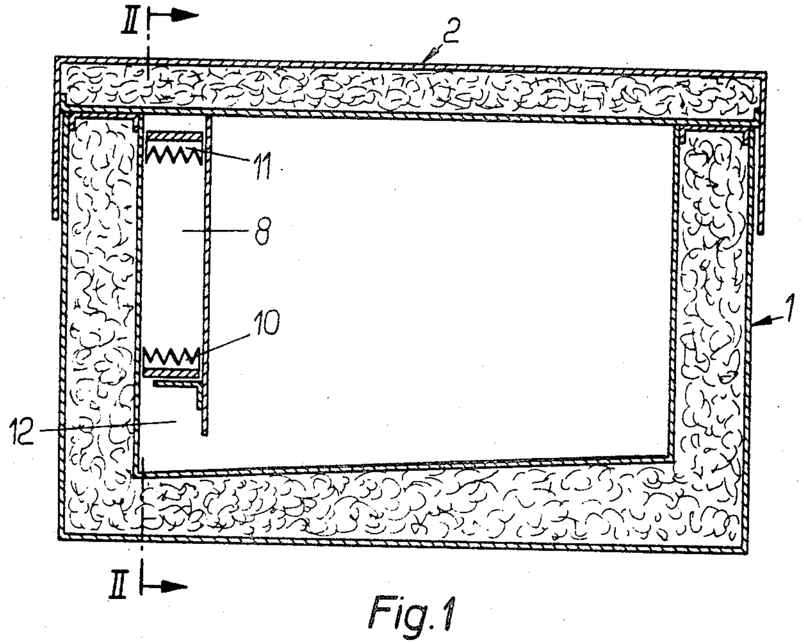
FIG. 1 is a vertical sectional view of a table container illustrating the invention used as an ice cube container.

FIG. 9 is a vertical section of an ice cube container presented in the same manner as in FIG. 1, illustrating a modification of the invention.

FIG. 10 is a vertical section of the container of FIG. 9, taken on line X—X of this figure. The section of FIG. 9 is taken on line IX—IX of FIG. 10.

Figure 2:
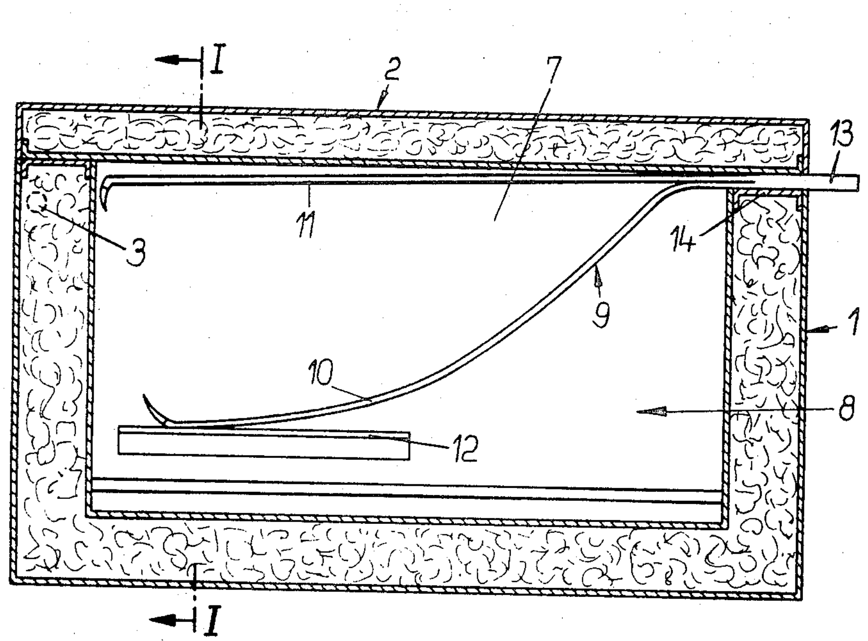
FIG. 2 is a vertical sectional view of the container according to FIG. 1, taken on the line II—II thereof. The section of FIG. 1 is taken on the line I—I of FIG. 2.

In the examples of FIGS. 1 and 2, a rack means is provided which includes a removable partition or dividing wall means 7 installed in the inside of the actual open-top container body structure 1, which wall means separates a narrow chamber or compartment 8 from the main inner space of the body structure 1. The container structure has a hinged cover 2 attached to one of its sides. Into the narrow chamber 8 the ice cube tongs 9 are stored. The tongs 9 have a holding portion comprising one curved leg 10 and one comparatively straight leg 11. The rack means also includes a support 12. The curved leg 10 of the tongs extends toward the bottom of the chamber 8 and rests on the support 12 which is shown as attached to the wall 7 that serves as the means for guiding and holding the tongs. The straight leg 11 essentially closes off the chamber 8 at its top. The handle 13 of the tongs 9 extends away from the cover hinge pin 3 on the opposite side of the container 1 through a clearance means or notch 14 provided in its upper edge, and projects out from under the lid or cover 2. In this way the handle 13 of the tongs 9 serves as a means for opening and closing the lid 2, with the curved leg 10 of the tongs 9 being guided over the support 12.

Figures 3, 4:
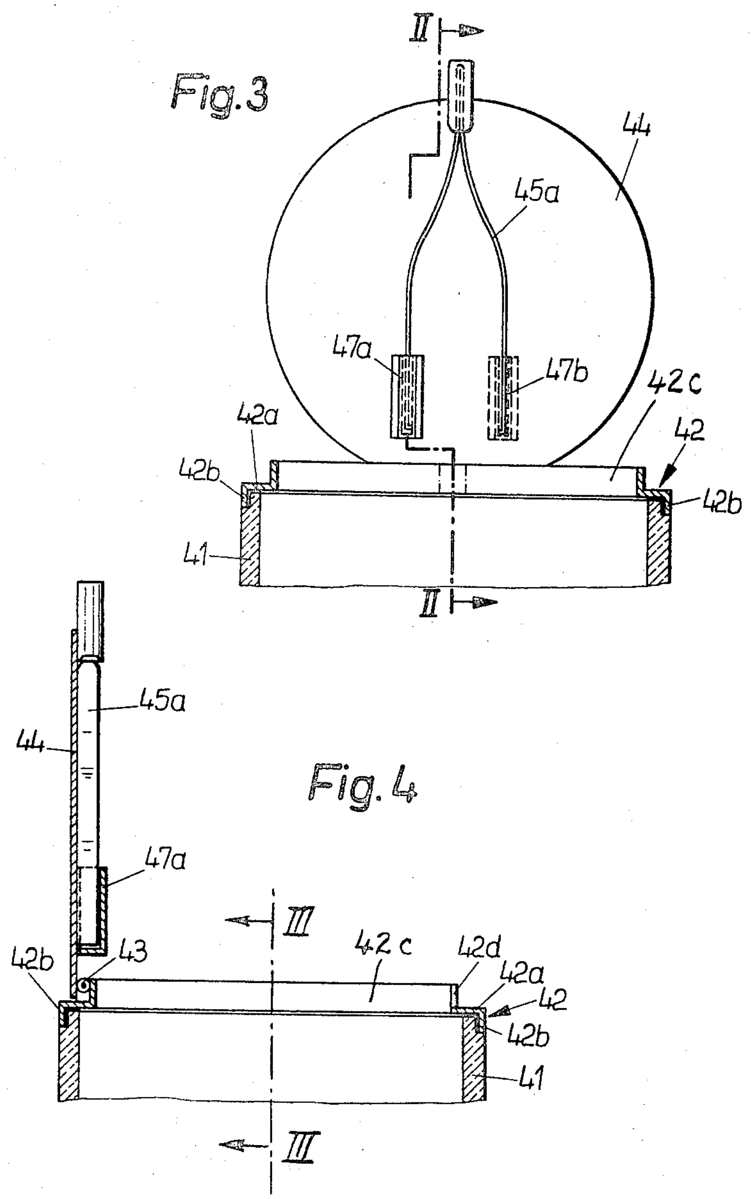
FIG. 3 is a view partly in vertical section and partly in elevation, of a table container according to the invention used as a sugar box, the lower portion of the container being omitted and the lid or cover being in raised position.
FIG. 4 is a vertical sectional view of the table container according to FIG. 3, taken on the line IV—IV thereof. The section of FIG. 3 is taken on the line III—III of FIG. 4.

The examples of FIGS. 3 and 4 concern a sugar box with a glass container body structure 41 in a round cross-section. On the upper edge of the glass structure 41, there is a superimposed circular-shaped upper edge 42 made of metal. This circular-shaped part 42 on the upper edge comprises a circular-shaped horizontal support **42*a*, an outer depending flange 42*b* which reaches out over the upper edge of the glass structure 41 and on top of the support 42*a* a rim 42*c* which runs around the inside, for cooperation with the tilting circular lid 44 which is joined to the upper edge 42 by a hinge 43. The lid 44 is flat on top and smoothly formed, and on its underside has a bracket 47*a*, 47*b* for sugar tongs 45*a*. In place of the tongs 45*a* (FIG. 8) a sugar spoon 46** may be utilized by suitable modification of the bracket, as described in detail later.

As the drawing shows, the sugar tongs 45 (or the sugar spoon 46) then extend, in a position determined by the holding bracket **47*a*, 47*b* through a notch 42*d* which is lined up with the hinge 43. The end of the handle of the tongs 45*a* (or the spoon) then extends out over the circumference of the lid and rests against the circumference of the flange 42*b* and of the glass structure 41** (see FIG. 5) and thereby forms a convenient handle for opening and closing the lid.

The supporting rim 42 which is provided to assure the tight closing of the lid 44 has an opening or notch **42*d* at the place where the handle of the tongs 45*a* (or the spoon 46**) fits.

In the examples of FIGS. 3 and 4, the lid 44 has attached to its bottom at least one pocket or noose **47*a* (or 47*b*) which is so joined to the bottom that the tongs 45*a* (of the kind having two curved legs) are held against said bottom with one leg placed in the pocket and with the other leg unattached. If desired, the second pocket can also be provided on the bottom of the lid for the other leg of the tongs. Or, the pocket 47*a* can be sufficiently wide to receive both legs of the tongs. By holding them directly against the bottom of the lid 44, the tongs 45*a* are maintained above and separate from the contents of the container 41**, and the necessity for providing anything in the nature of an isolating device in the container is eliminated.

In the examples of FIGS. 5 through 7, a holding and guiding mechanism for tongs on the bottom of the lid 44 and at the inside of the container structure 41 is detailed. At the bottom of the lid 44 a pocket 47 is attached, into which there is placed the one straight leg of a sugar tongs 45, while the second leg of the tongs projects down from the bottom of the lid. For the one curved leg of the tongs which projects downward there is provided a compartment 51 for the purpose of keeping the contents of the container separate or isolated from the aforementioned leg. This compartment is formed by two parallel side strips **51*a* and two parallel ends strips 51*b***.

In the example of FIG. 8 the sugar spoon 46 is held to the bottom of the lid 44 in a manner corresponding to the way the sugar tongs **45*a* are held in FIGS. 3 and 4. The holding and guiding bracket for the sugar spoon 46 here consists of a receiving pocket 48 which holds the tip of the spoon, and a clip 49 which holds the handle of the spoon. After the tip of the spoon is inserted in the pocket 48, then the handle of the spoon can be swivelled in as indicated by the arrow 50, or else in order to remove the spoon it is swung out in a direction opposite to that indicated by the arrow. Underneath the holding and guiding brackets 48 and 49 there may be provided in FIG. 8 a flat compartment 52 for the spoon 46 (illustrated by a dotted line), in case the curvature of the spoon 46** causes it to project comparatively deeply down into the contents of the container.

In the example according to FIG. 7, the compartment 51, or the compartment 52 in FIG. 8 may be constructed as one operative unit with the rim 42 and the lid 44. This unit is fastened to the upper edge of the container by cementing or glueing it on. Instead of the cementing or glueing shown in the examples, the fastening could also be achieved by a screw or bayonet closure (not shown) or else by a frictional fit so that the unit described above could, for instance, be removed from the actual container 41 for cleaning. The upper rim 42, the lid 44, the holding and guiding brackets 47, **47*a* and 47*b* as well as 48 and 49, the compartments 11 ant 12** in the examples of FIGS. 3 through 8 are made out of a metal such as refined steel, or else with a refined steel or chromed surface.

In the examples of FIGS. 9 and 10 the holding and guiding means 7 and 32 for the utensil are constructed preferably of metal, in basically the same way as with the sugar box of FIGS. 5 through 7. All the other parts of the table container for ice, which correspond to those in FIGS. 1 and 2, carry the same reference symbols as in the beginning figures. According to the invention as illustrated in FIGS. 9 and 10, on the lower side 5 of the lid 2 above the compartment 53 there is a bracket 32 for the tongs, so that the latter can be stored in the compartment 53 underneath the lid. In the illustrations, this storing arrangement is constructed like a pocket which is attached to the bottom of the lid 5. It consists of a fairly long noose or saddle 32 into which can be placed the upper straight leg 31 of the tongs 5 as illustrated, and an abutment plate 33 against which the end of the leg of the tongs 31 rests. In order to insert the leg of the tongs more easily, it is made with a cross-ribbed section 34 at the end, as opposed to the tongs shown in FIGS. 1 and 2 which works together with a claw intended for the curved leg 10. Moreover, the straight leg 31 of the tongs can have a sharpened lining 35 on the end, so that it can separate frozen-together ice cubes.

It will now be seen from the foregoing that I have provided a novel and improved table container with hinged cover and stored dispensing utensil, wherein a rack means holds the utensil within the container, and wherein the projecting utensil handle is utilized, by lifting it, to raise the cover and condition the device for removal of the contents.

I claim:

1. A table container for material which is in the form of substantially discrete particles, comprising in combination:

(a) an open-top container structure having a cover hinged to one of its sides to swing upward for exposing the container interior, (b) a utensil having a serving portion and a handle extending away from the serving portion, wherein the improvement comprises:

(c) rack means for supporting the utensil in a storage position within the container when the cover is closed, (d) said container having clearance means enabling the handle to protrude from it at a location opposite to said one container side when the utensil is in said racked storage position and the cover is closed, (e) said handle and rack constituting a means for opening and closing the lid, (f) said rack constituting a holding and guiding means which keeps the utensil separate from the contents of the container.

2. A table container as in claim 1, wherein:

(a) wall means arre provided in the container, forming a separate compartment in the inside, (b) said rack means being cooperable with said wall means, (c) said wall means and rack means constituting a guide and support which enables the utensils to swing in essentially a vertical direction either up or down, (d) said cover and utensil having a simple abutting engagement.

3. A table container as in claim 1, wherein:

(a) said utensil comprises a tongs having one substantially straight leg and one non-linear leg, (b) wall means arre provided in the container, forming a separate vertical compartment in the inside, (c) said non-linear leg projecting downward into said vertical compartment, (d) said straight leg extending substantially horizontally and across the top area of said compartment.

4. A table container as in claim 3, wherein:

(a) said rack means is disposed in said vertical compartment.

5. A table container as in claim 1, wherein:

(a) the rack means is carried by the cover of the container adjacent the underside thereof, (b) said utensil being elongate and said rack means holding the utensil to extend substantially at right angles to the hinge axis of the container cover, (c) said rack means enabling the utensil to be removed from or applied to it in said direction in which it extends.

6. A table container as in claim 5, wherein:

(a) said rack means comprises a pocket structure disposed on the underside of the container cover.

7. A table container as in claim 6, wherein:

(a) wall means arre provided in the container, forming a compartment which is cooperable with the rack means and arranged to receive lower portions of said utensil.

8. A table container as in claim 7, wherein:

(a) said wall means comprising two parallel relatively narrow strips extending between opposite portions of the rim of the container.

9. A table container as in claim 1, wherein:

(a) the container cover comprises a flat disk, (b) a narrow rim on the top edge of the container, (c) said rim at a location opposite the hinge connection of the cover having a notched adapted to accommodate the handle of the utensil.

10. A table container as in claim 1, wherein:

(a) the container cover comprises a flat disk, (b) said utensil being elongate, (c) said rack means being carried by the underside of the cover and holding the utensil in a diametric position under the cover.

11. A table container as in claim 6, wherein:

(a) wall means are provided, forming a compartment which is cooperable with the rack means, (b) a separate rim on the top edge of the container, (c) said cover being hingedly attached to said separate rim, (d) said rim, cover, rack means and wall means constituting an operable unit which is removable from the remainder of the container.

12. A table container as in claim 1, wherein:

(a) wall means are provided in the container, forming a separate compartment in the inside, (b) said rack means being cooperable with said wall means, (c) said wall means and rack means constituting a guide and support which enables the utensil to swing in essentially a vertical direction either up or down, (d) said wall means removable from the inside of the container.

References Cited

UNITED STATES PATENTS

| | | | |
|---|---|---|---|
| 1,079,942 | 12/1913 | Langan | 220—185 XR |
| 2,738,900 | 3/1956 | Wenger | 222—114 |

THERON E. CONDON, *Primary Examiner.*

G. T. HALL, *Assistant Examiner.*